United States Patent
Ghattas et al.

(10) Patent No.: US 12,436,179 B2
(45) Date of Patent: Oct. 7, 2025

(54) IDENTIFYING FAULT IN TORQUE SIGNAL / TORQUE SENSOR FOR AIRCRAFT SYSTEM

(71) Applicant: Pratt & Whitney Canada Corp., Longueuil (CA)

(72) Inventors: Andrew Ghattas, La Prairie (CA); Michael P. Smith, Mississauga (CA); Charles Bolon-Bruhn, Longueuil (CA)

(73) Assignee: Pratt & Whitney Canada Corp., Longueuil (CA)

( * ) Notice: Subject to any disclaimer, the term of this patent is extended or adjusted under 35 U.S.C. 154(b) by 105 days.

(21) Appl. No.: 18/198,784

(22) Filed: May 17, 2023

(65) Prior Publication Data

US 2024/0385234 A1    Nov. 21, 2024

(51) Int. Cl.
*G01R 29/26*    (2006.01)
*B64D 45/00*    (2006.01)

(52) U.S. Cl.
CPC ...... *G01R 29/26* (2013.01); *B64D 2045/0085* (2013.01)

(58) Field of Classification Search
CPC ... G01R 29/26; B64D 2045/0085; G01L 3/10; G01L 25/003; G01M 15/14
USPC ................. 324/614, 613, 612, 600
See application file for complete search history.

(56) References Cited

U.S. PATENT DOCUMENTS

| | | | |
|---|---|---|---|
| 8,108,096 B2 | 1/2012 | Dlugoss | |
| 8,417,411 B2 | 4/2013 | Dlugoss | |
| 10,852,224 B2 * | 12/2020 | Espejord | G01N 17/04 |
| 11,747,384 B2 * | 9/2023 | Boglione | G01R 29/26 |
| | | | 324/613 |
| 12,140,075 B2 * | 11/2024 | Hamzehi | G05B 23/0235 |
| 12,140,085 B2 | 11/2024 | Meunier | |
| 2010/0222961 A1 | 9/2010 | Dlugoss | |
| 2013/0116937 A1 | 5/2013 | Calhoun | |
| 2016/0123821 A1 * | 5/2016 | Jolly | G01L 3/10 |
| | | | 73/862.329 |
| 2017/0167287 A1 * | 6/2017 | Jacobs | G01L 25/003 |
| 2023/0057234 A1 * | 2/2023 | Huff | B64D 31/06 |
| 2024/0385234 A1 | 11/2024 | Ghattas | |

FOREIGN PATENT DOCUMENTS

| | | |
|---|---|---|
| CN | 117760624 A | 3/2024 |
| EP | 4187065 B1 | 8/2024 |

OTHER PUBLICATIONS

EP Search Report for EP Patent Application No. 24176585.8 dated Oct. 10, 2024.

* cited by examiner

*Primary Examiner* — Giovanni Astacio-Oquendo
(74) *Attorney, Agent, or Firm* — Getz Balich LLC (57) ABSTRACT

A method is provided for operating an aircraft system. During this method, a shaft of an aircraft powerplant is rotated. A torque signal is received indicative of a torque applied to the shaft while the shaft is rotating. A noise parameter is determined indicative of noise in the torque signal. A fault is identified in the torque signal when the noise parameter is equal to or greater than a threshold.

19 Claims, 5 Drawing Sheets

IDENTIFYING FAULT IN TORQUE SIGNAL / TORQUE SENSOR FOR AIRCRAFT SYSTEM

TECHNICAL FIELD

This disclosure relates generally to an aircraft system and, more particularly, to monitoring a torque signal and/or a torque sensor for the aircraft system.

BACKGROUND INFORMATION

An aircraft system may include a sensor for measuring torque applied to a shaft of a gas turbine engine. Under certain conditions, the sensor may malfunction and output a faulty torque signal. Various methods and systems are known in the art for determining if a torque sensor is malfunctioning. While these known methods and systems have various benefits, there is still room in the art for improvement.

SUMMARY

According to an aspect of the present disclosure, a method is provided for operating an aircraft system. During this method, a shaft of an aircraft powerplant is rotated. A torque signal is received indicative of a torque applied to the shaft while the shaft is rotating. A noise parameter is determined indicative of noise in the torque signal. A fault is identified in the torque signal when the noise parameter is equal to or greater than a threshold.

According to another aspect of the present disclosure, another method is provided for operating an aircraft system. During this method, a rotating structure of an aircraft powerplant is rotated. A torque signal is received indicative of a torque applied to the rotating structure while the rotating structure is rotating. A signal-to-noise ratio is determined of the torque signal. A fault in the torque signal is identified when the signal-to-noise ratio is equal to or greater than a threshold.

According to still another aspect of the present disclosure, a system is provided for an aircraft. This aircraft system includes a rotating structure, a torque sensor and a controller. The rotating structure is configured as or otherwise includes an engine shaft. The torque sensor is configured to provide a torque signal indicative of a torque applied to the rotating structure while the rotating structure is rotating. The controller in signal communication with the torque sensor. The controller is configured to determine a noise parameter indicative of noise in the torque signal. The controller is configured to identify a fault in the torque signal when the noise parameter is equal to or greater than a threshold.

The noise parameter may be indicative of a signal-to-noise ratio of the torque signal.

The torque sensor may be configured as or otherwise include a phonic wheel mounted to the rotating structure.

The aircraft system may also include a gas turbine engine which includes the rotating structure.

The rotating structure may be configured as or otherwise include an engine shaft.

The rotating structure may be configured as or otherwise include a bladed rotor.

The noise parameter may be a signal-to-noise ratio of the torque signal.

The noise parameter may be determined over a period of time.

The threshold may be a fixed threshold.

The threshold may be a variable threshold.

The method may also include determining the threshold based on one or more operational parameters for the aircraft powerplant.

The method may also include determining the threshold based on one or more previously determined noise parameters.

The method may also include identifying a fault in a torque sensor when the fault in the torque signal is identified. The torque signal may be received from the torque sensor.

The torque signal may be received from a torque sensor. The torque sensor may include a phonic wheel arranged with the shaft.

The method may also include providing a notification when the fault is identified in the torque signal.

The method may also include: performing a control operation for the aircraft powerplant based on actual torque data from the torque signal when the fault is not identified in the torque signal; and/or performing the control operation based on estimated torque data when the fault is identified in the torque signal.

The aircraft powerplant may be configured as part of an aircraft propulsion system.

The aircraft powerplant may be configured as part of an aircraft power generation system.

The aircraft powerplant may be configured as or otherwise include a gas turbine engine.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
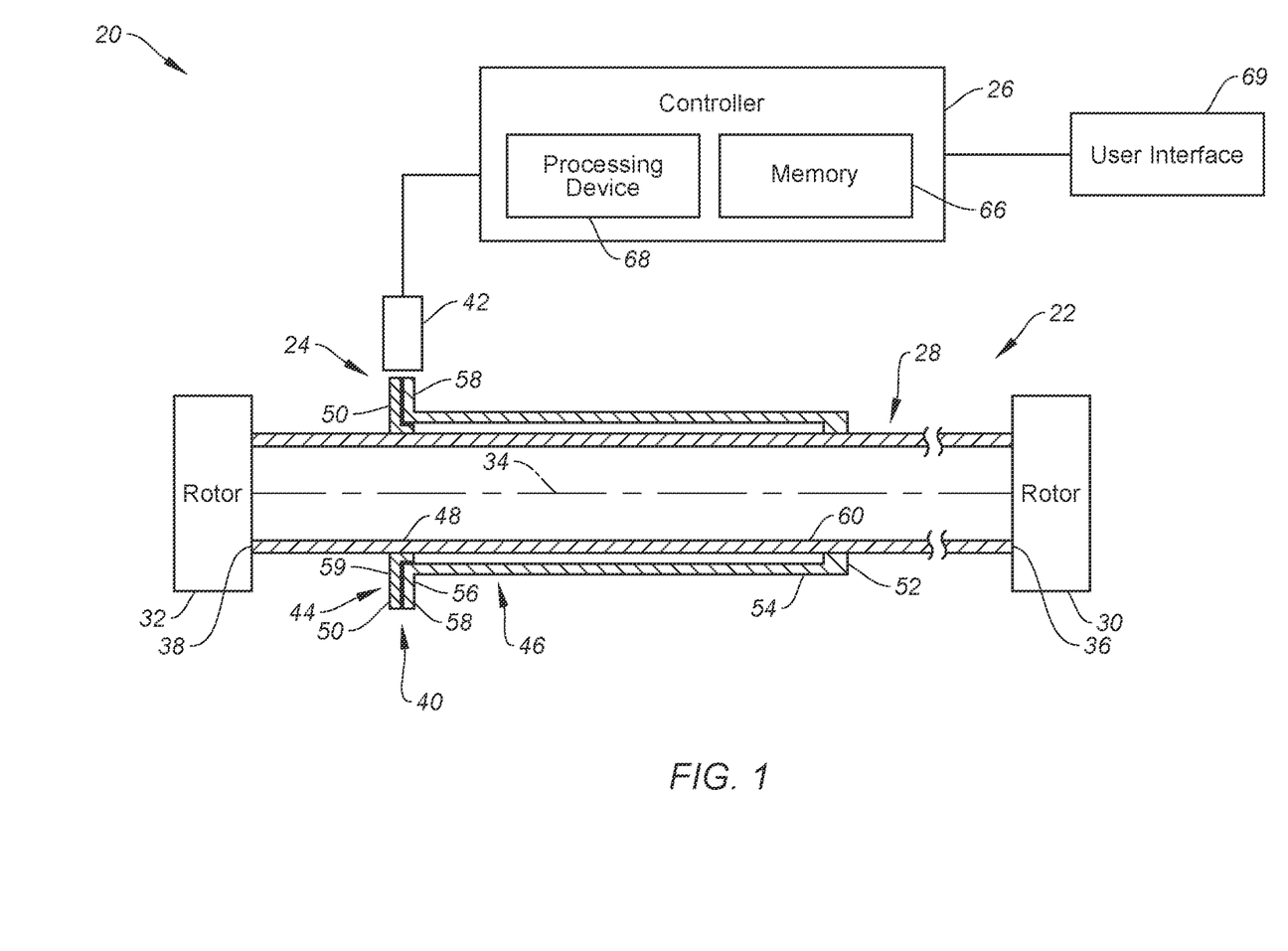
FIG. 1 is a partial schematic illustration of an assembly for an aircraft powerplant.

FIG. 1 illustrates an assembly 20 for a powerplant of an aircraft. The aircraft may be an airplane, a drone (e.g., an unmanned aerial vehicle (UAV)) or any other manned or unmanned aerial vehicle. The aircraft powerplant may be configured as, or otherwise included as part of, a propulsion system for the aircraft. The aircraft powerplant may also or alternatively be configured as, or otherwise included as part of, an electrical power system for the aircraft. The powerplant assembly 20 includes a powerplant rotating structure 22, a sensor system 24 and a controller 26.

The rotating structure 22 of FIG. 1 includes a shaft 28 and one or more rotors 30 and 32. The shaft 28 extends axially along an axis 34 between a first end 36 of the shaft 28 and a second end 38 of the shaft 28, which axis 34 may be a centerline axis and/or a rotational axis of the rotating structure 22 and its members 28, 30 and/or 32. This shaft 28 is configured to transfer mechanical power between the first rotor 30 and the second rotor 32. The first rotor 30 of FIG. 1, for example, may be configured as or otherwise include a turbine rotor. This first rotor 30 may be attached (e.g., mechanically fastened) to the shaft 28 at (e.g., on, adjacent or proximate) the shaft first end 36. The second rotor 32 of FIG. 1 may be configured as or otherwise include a driven rotor such as, but not limited to, a propulsor rotor or a generator rotor. This second rotor 32 may be attached to the shaft 28 at the shaft second end 38. With such a configuration, the first rotor 30 is operable to drive rotation of the second rotor 32 through the shaft 28. The present disclosure, however, is not limited to such an exemplary arrangement. The rotating structure 22, for example, may also include one or more intermediate components between the shaft 28 and the first rotor 30 and/or the second rotor 32 such as, but not limited to, a geartrain, another rotor and/or another shaft. Moreover, the present disclose is not limited to the foregoing exemplary rotor configurations. The first rotor 30, for example, may be configured as a coupler or another device through which another input device may drive rotation of the rotating structure 22 and its shaft 28. The second rotor 32 may also or alternatively be configured as a coupler or another device through which the rotating structure 22/the other input device may rotationally drive a mechanical load.

The sensor system 24 is configured to measure one or more engine parameters indicative of shaft torque. The term "shaft torque" may describe torque transmitted through at least an axial portion or an entirety of the rotating structure 22 and/or its shaft 28. The sensor system 24 of FIG. 1 includes a sensor rotor 40 and a sensor probe 42; e.g., a torque sensor.

The sensor rotor 40 may be configured as a phonic wheel with inter-digited tooth pairs. The sensor rotor 40 of FIG. 1, for example, includes a torque rotor 44 and a reference rotor 46.

Figure 2:
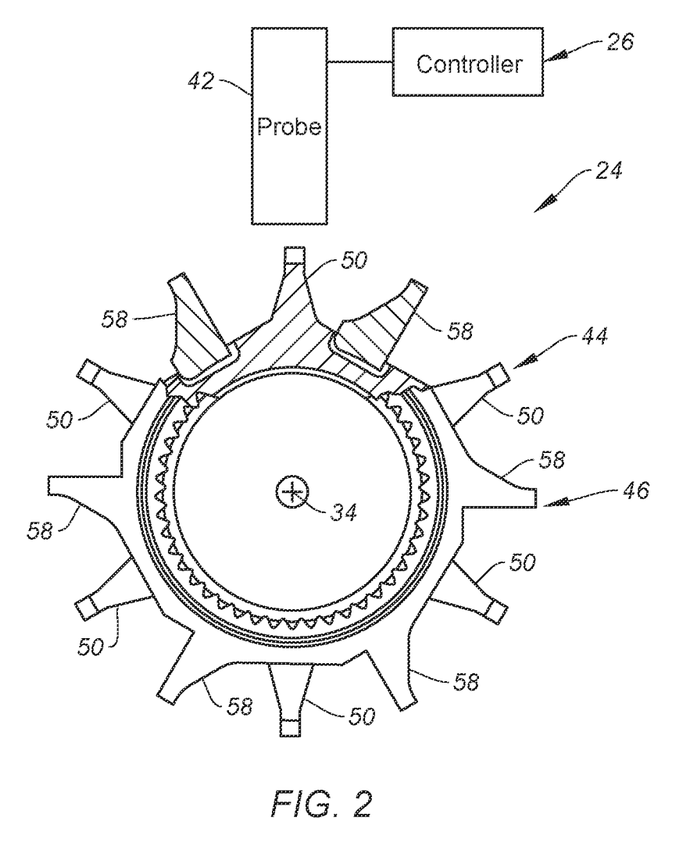
FIG. 2 is a cutaway illustration of a sensor rotor configured with other components of the powerplant assembly.

The torque rotor 44 is connected to (e.g., formed integral with, or fastened, welded, bonded and/or otherwise attached to) the rotating structure 22 and its shaft 28 at an axial first location 48. The torque rotor 44 of FIG. 1 projects radially out from the shaft 28 to an outer periphery. Referring to FIG. 2, the torque rotor 44 includes one or more torque teeth 50 arranged circumferentially about the axis 34 in a circular array at the torque rotor outer periphery.

Referring to FIG. 1, the reference rotor 46 includes a rotor mount 52, a rotor tube 54, a rotor hub 56 and one or more reference teeth 58 (e.g., see FIG. 2). The rotor mount 52 is connected to (e.g., formed integral with, or fastened, bonded and/or otherwise attached to) the shaft 28 at an axial second location 60. This second location 60 is axially spaced (e.g., separated) from the first location 48 along the axis 34 by a relatively large distance. The rotor tube 54 connects the rotor hub 56 to the rotor mount 52. The rotor tube 54 of FIG. 1, for example, is formed integral with and extends axially along the axis 34 and the shaft 28 from the rotor mount 52 to the rotor hub 56. An entirety of the rotor tube 54 is radially spaced outward from the shaft 28. The rotor hub 56 is arranged axially next to (e.g., immediately adjacent, but not touching) a hub 59 of the torque rotor 44. Referring to FIG. 2, the reference teeth 58 are arranged circumferentially about the axis 34 in a circular array at an outer periphery of the rotor hub 56.

Figure 3A:
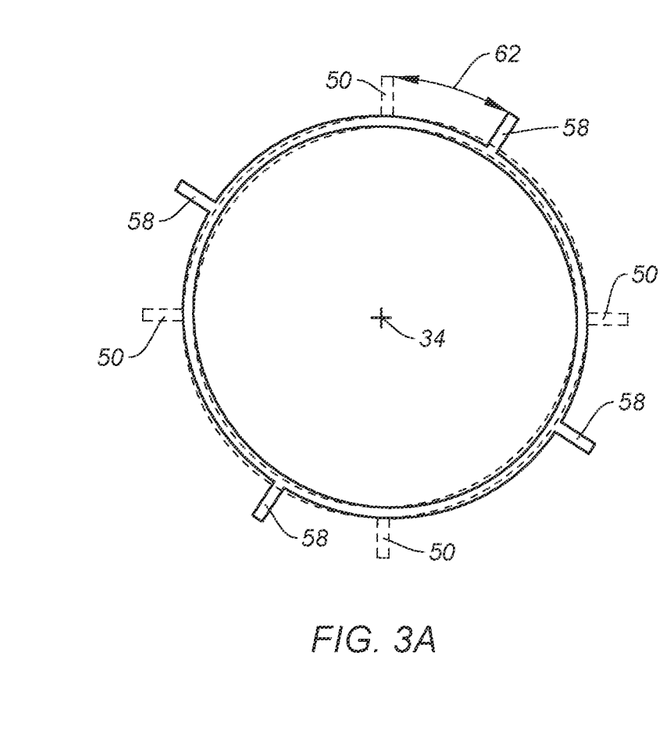
FIGS. 3A and 3B are schematic illustrations depicting movement between teeth of the sensor rotor during different modes of turbine engine operation.
Figure 3B:
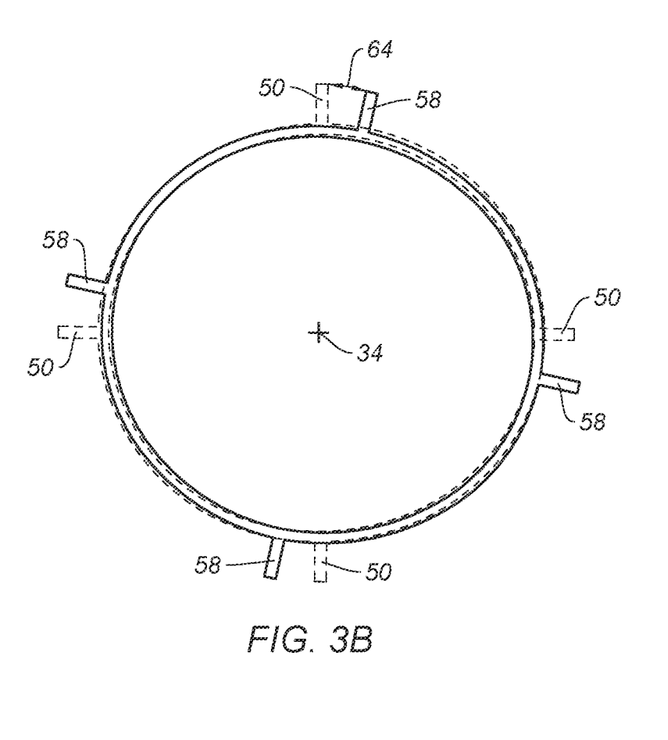

The torque teeth 50 of FIG. 2 are interspersed with the reference teeth 58, and vice versa. Each of the reference teeth 58, for example, is located within a respective gap circumferentially between a circumferentially adjacent pair of the torque teeth 50. Similarly, each of the torque teeth 50 is located within a respective gap circumferentially between a circumferentially adjacent pair of the reference teeth 58. With this arrangement, the torque teeth 50 are configured to circumferentially move (e.g., shift) relative to and without impediment (e.g., blockage, resistance, etc.) from the reference teeth 58 during rotation of the rotating structure 22. For example, during a first condition (e.g., where the rotating structure 22 is unloaded or subject to a relatively small torque) of FIG. 3A, each of the reference teeth 58 is spaced from a respective torque tooth by a circumferential first distance 62. During a second condition (e.g., where the rotating structure 22 is subject to a relatively high torque) of FIG. 3B, each of the reference teeth 58 is spaced from a respective torque tooth by a circumferential second distance 64 that is different (e.g., less, or alternatively greater) than the first distance 62.

Referring to FIG. 1, the sensor probe 42 may be configured as a magnetic pickup probe. The sensor probe 42 is configured to measure movement (e.g., shifts) between the torque teeth 50 and the reference teeth 58 during rotation of the rotating structure 22. The sensor probe 42, for example, may be configured to output sensor data (e.g., a voltage signal) indicative of when each of the teeth 50, 58 passes a tip of the sensor probe 42. For example, the sensor probe 42 may generate an electric pulse each time a tip of one of the teeth 50, 58 passes the sensor probe tip. These electric pulses may be output from the sensor system 24 and its sensor probe 42 in a form of a torque signal, which torque signal is indicative of a torque applied to the rotating structure 22 and its shaft 28.

The controller 26 is in signal communication with the sensor system 24. The controller 26 of FIG. 1, for example, may be hardwired to and/or wirelessly coupled with the sensor probe 42.

The controller 26 may be configured as an onboard engine controller; e.g., an electronic engine controller (EEC), an electronic control unit (ECU), a full-authority digital engine controller (FADEC), etc. The controller 26 may be implemented with a combination of hardware and software. The hardware may include memory 66 and at least one processing device 68, which processing device 68 may include one or more single-core and/or multi-core processors. The hardware may also or alternatively include analog and/or digital circuitry other than that described above.

The memory 66 is configured to store software (e.g., program instructions) for execution by the processing device 68, which software execution may control and/or facilitate performance of one or more operations such as those described herein. The memory 66 may be a non-transitory computer readable medium. For example, the memory 66 may be configured as or include a volatile memory and/or a nonvolatile memory. Examples of a volatile memory may include a random access memory (RAM) such as a dynamic random access memory (DRAM), a static random access memory (SRAM), a synchronous dynamic random access memory (SDRAM), a video random access memory (VRAM), etc. Examples of a nonvolatile memory may include a read only memory (ROM), an electrically erasable programmable read-only memory (EEPROM), a computer hard drive, etc.

Figure 4:
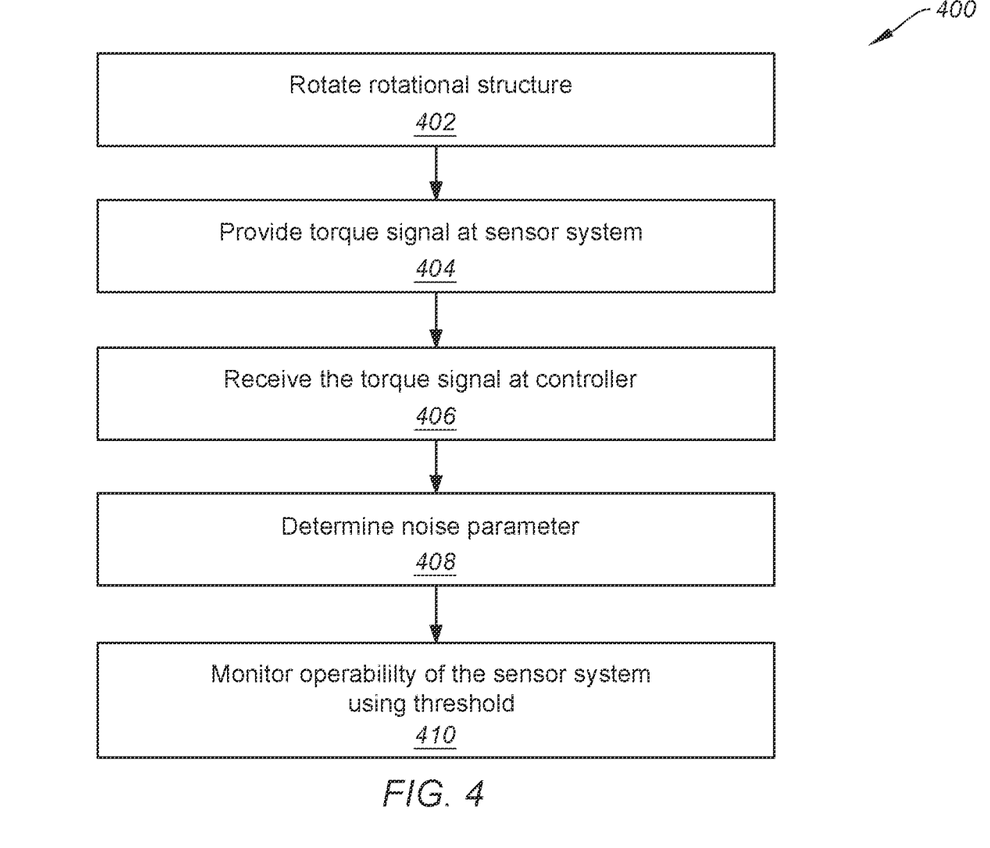
FIG. 4 is a flow diagram of a method for operating an aircraft system.

FIG. 4 is a flow diagram of a method 400 for operating an aircraft system. For ease of description, this method 400 is described below with reference to the powerplant assembly 20 of FIG. 1. The method 400 of the present disclosure, however, is not limited to such an exemplary arrangement.

In step 402, the rotating structure 22 is rotated. The controller 26 (or another controller), for example, may initiate or continue operation of the aircraft powerplant.

During this aircraft powerplant operation, the first rotor 30 may drive rotation of the second rotor 32 through the shaft 28.

In step 404, the sensor system 24 provides (e.g., generates and outputs) the torque signal. In particular, the sensor system 24 of FIG. 1 measures the one or more engine parameters indicative of the torque applied to the rotating structure 22 and its shaft 28 (the shaft torque). The sensor probe 42 of FIGS. 1 and 2, for example, may generate and/or output an electric pulse each time the tip of one of the sensor rotor teeth 50, 58 passes (e.g., is in close radial proximity with) the tip of the sensor probe 42. These electrical pulses may be communicated from the sensor system 24 to the controller 26 as the torque signal. This torque signal is indicative of the shaft torque as described below in further detail.

In step 406, the controller 26 receives the torque signal from the sensor system 24.

In step 408, the controller 26 processes the received torque signal to determine a noise parameter. This noise signal is indicative (or based on) signal noise in the torque signal received from the sensor system 24 during operation of the powerplant assembly 20/rotation of the rotating structure 22 and its shaft 28. The controller 26, for example, may process (e.g., analyze) the torque signal to determine a signal-to-noise (S/N) ratio of the torque signal. The noise parameter may be, or may be calculated based on, the signal-to-noise ratio. Various methodologies are known in the art for determining a signal-to-noise ratio of a signal, and the present disclosure is not limited to any particular ones thereof. Examples of particularly suitable methodologies for determining the signal-to-noise ratio, however, may include those calculated based on (A) a number and/or an amplitude of excess peak or troughs in the torque signal and/or (B) a root mean square (RMS) of torque signal amplitude(s).

Under certain unusual conditions, operability of the sensor system 24 may deteriorate or fail. For example, an attachment of the sensor probe 42 may fail and the sensor probe 42 may begin to vibrate and/or otherwise move from its otherwise fixed position. In another example, an attachment of the sensor rotor 40 as a whole or one or its members 44 and/or 46 may fail and the sensor rotor 40 and/or its members 44 and/or 46 may move (e.g., in an unintended fashion) relative to the rotating structure 22 and its shaft 28. In still another example, one or more of the teeth 50, 58 may break off, fragment or otherwise fail. Each of the foregoing situations (as well as various other situations) may introduce unusual and/or excessive noise into the torque signal. In some cases, this unusual and/or excessive noise may be readily detectable where, for example, there are large dramatic deviations in the torque signal. In other cases, however, the unusual and/or excessive noise may be difficult to detect using normal processes.

In step 410, the controller 26 monitors the operability (e.g., health) of the sensor system 24. The controller 26, for example, may compare the noise parameter (e.g., the signal-to-noise ratio) to a noise threshold. Where the noise parameter is less than the threshold, the controller 26 may determine that the torque signal is usable and/or the sensor system 24 and its members 44 and/or 46 are operational. However, where the noise parameter is equal to or greater than the threshold (for a certain period of time), the controller 26 may identify a fault in the torque signal and/or a fault in (e.g., a malfunction of) the sensor system 24 and its members 44 and/or 46.

In some embodiments, the threshold may be a fixed threshold. The threshold, for example, may remain uniform (the same) across a range of (e.g., all) operating conditions. In other embodiments, the threshold may be a variable threshold. The threshold, for example, may be determined (e.g., selected, calculated, etc.) based on one or more operational parameters of the aircraft powerplant. Examples of these operational parameters include, but are not limited to: a power setting of a heat engine, such as an internal combustion engine, or electric motor included in the aircraft powerplant; and one or more flight conditions such as flight speed, ambient temperature, ambient pressure, expected turbulence, etc. For example, the threshold may be selected using a lookup table based on one or more of the operational parameters. In another example, the threshold may be calculated using a model with one or more of the operational parameters as inputs. The threshold may also or alternatively be determined based on one or more previously determined noise parameters. This may be useful for updating the threshold to account for, for example, slight deterioration of aircraft powerplant performance (e.g., slightly increase vibrations, etc.) over a lifetime of the aircraft powerplant.

Where it is determined that the torque signal is usable and/or the sensor system 24 and its members 44 and/or 46 are operational, the controller 26 (or another controller) may use the torque signal to control and/or monitor operation of the aircraft powerplant. For example, the controller 26 may use actual torque data generated (e.g., calculated) by processing the torque signal to control and/or monitor operation of the aircraft powerplant. However, where a fault is identified in the torque signal and/or the sensor system 24, the controller 26 (or another controller) may alternatively use replacement torque data to control and/or monitor operation of the aircraft powerplant; e.g., the torque signal may be discarded. This replacement torque data may be estimated (e.g., modeled) from other operating parameters. The replacement torque data may also or alternatively be estimated based on previous actual torque data (e.g., a historical baseline) calculated prior to identifying the fault. In addition or alternatively, the controller 26 may also signal a user interface 69 (e.g., an indicator light, a gauge, a monitor, etc.) to provide a notification that the fault was identified. This notification may be provided to an operator of the aircraft propulsion system, for example, during aircraft flight. The notification may also or alternatively be provided to maintenance personnel following (or remotely during) aircraft flight. This may facilitate inspection of the aircraft powerplant to investigate a source of the identified fault.

Figure 5:
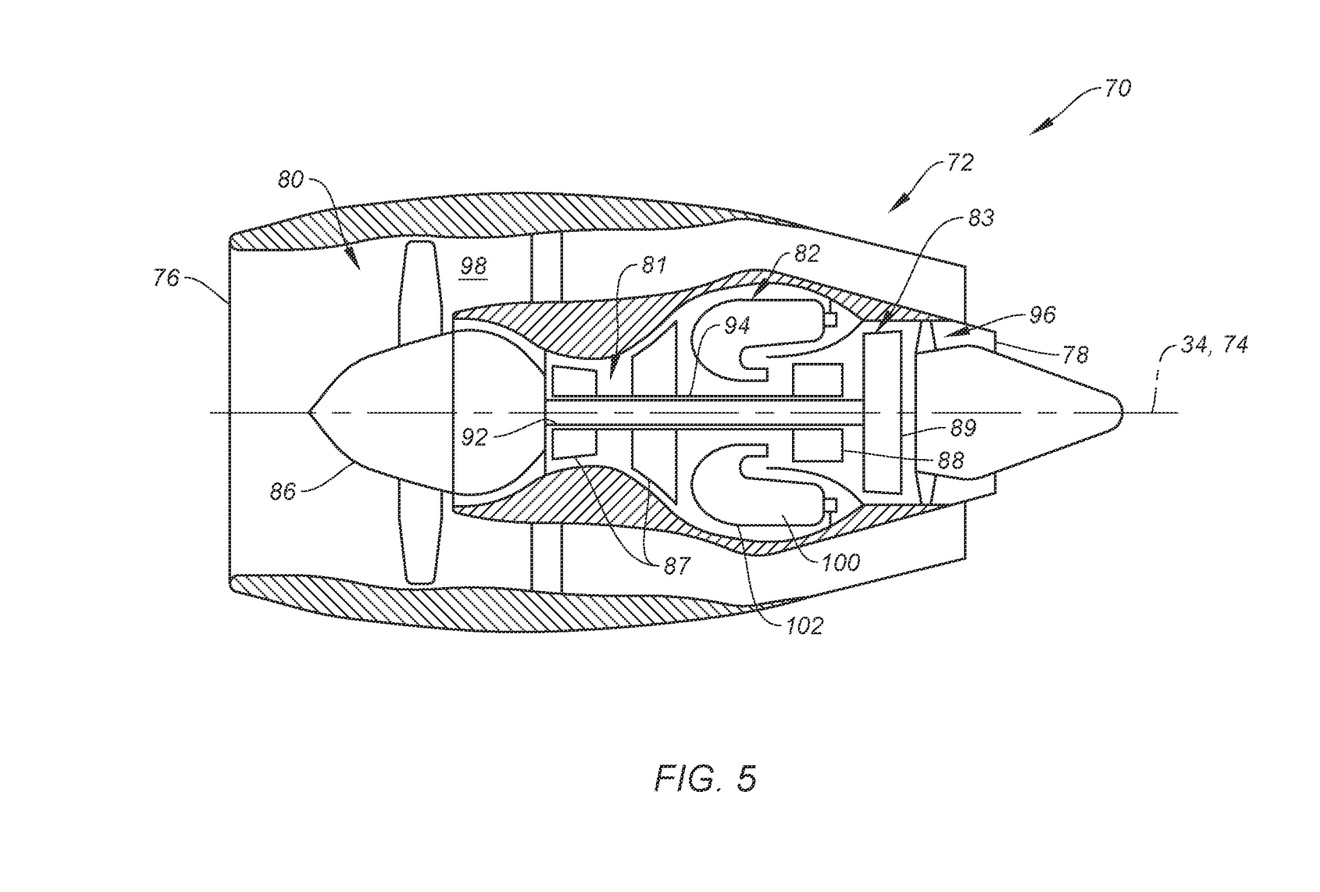
FIG. 5 is a side sectional illustration of an aircraft system with a gas turbine engine which may include the powerplant assembly.

FIG. 5 illustrates an exemplary embodiment of the aircraft powerplant as an aircraft propulsion system 70 with a turbofan gas turbine engine 72. This gas turbine engine 72 extends along an axial centerline 74 of the gas turbine engine 72 between an upstream airflow inlet 76 and a downstream combustion products exhaust 78, which axial centerline 74 may be coaxial with the axis 34. The gas turbine engine 72 includes a fan section 80, a compressor section 81, a combustor section 82 and a turbine section 83.

The fan section 80 includes a fan rotor 86. The compressor section 81 includes a compressor rotor 87. The turbine section 83 includes a high pressure turbine (HPT) rotor 88 and a low pressure turbine (LPT) rotor 89, where the LPT rotor 89 is configured as a power turbine (PT) rotor. Each of these bladed engine rotors 86-89 includes a plurality of rotor blades arranged circumferentially around and connected to one or more respective rotor disks.

The fan rotor 86 is connected to the LPT rotor 89 through a low speed shaft 92, where at least (or only) these components 86, 89 and 92 may form a low speed rotating structure. The compressor rotor 87 is connected to the HPT rotor 88 through a high speed shaft 94, where at least (or only) these components 87, 88 and 94 may form a high speed rotating structure. The low speed shaft 92 and the high speed shaft 94 of FIG. 5 are rotatable about the axial centerline 74. The low speed shaft 92 of FIG. 5 extends through a bore of the high speed shaft 94 between the fan rotor 86 and the LPT rotor 89. The rotating structure 22 of FIG. 1 may be configured as either the low speed rotating structure, the high speed rotating structure or another rotating structure in the gas turbine engine 72. For example, the shaft 28, the first rotor 30 and the second rotor 32 of FIG. 1 may respectively be configured as the low speed shaft 92, the LPT rotor 89 and the fan rotor 86 of FIG. 5. In another example, the shaft 28, the first rotor 30 and the second rotor 32 of FIG. 1 may respectively be configured as the high speed shaft 94, the HPT rotor 88 and the compressor rotor 87 of FIG. 5.

During operation of the aircraft propulsion system 70 of FIG. 5, air enters the gas turbine engine 72 through the airflow inlet 76. This air is directed through the fan section 80 and into a core flowpath 96 and a bypass flowpath 98. The core flowpath 96 extends sequentially through the engine sections 81-83; e.g., a core of the gas turbine engine 72. The air within the core flowpath 96 may be referred to as "core air". The bypass flowpath 98 extends through a bypass duct, which bypasses the engine core. The air within the bypass flowpath 98 may be referred to as "bypass air".

The core air is compressed by the compressor rotor 87 and directed into a (e.g., annular) combustion chamber 100 of a (e.g., annular) combustor 102 in the combustor section 82. Fuel is injected into the combustion chamber 100 by one or more fuel injectors. This fuel is mixed with the compressed core air to provide a fuel-air mixture. The fuel-air mixture is ignited and combustion products thereof flow through and sequentially cause the HPT rotor 88 and the LPT rotor 89 to rotate. The rotation of the HPT rotor 88 drives rotation of the compressor rotor 87 and, thus, compression of air received from an inlet into the core flowpath 96. The rotation of the LPT rotor 89 drives rotation of the fan rotor 86, which fan rotor 86 propels the bypass air through and out of the bypass flowpath 98. The propulsion of the bypass air may account for a significant portion (e.g., a majority) of thrust generated by the turbine engine.

The powerplant assembly 20 may be included in various gas turbine engines other than the one described above. The powerplant assembly 20, for example, may be included in a geared gas turbine engine where a geartrain connects one or more shafts to one or more rotors in a fan section, a compressor section and/or any other engine section. Alternatively, the powerplant assembly 20 may be included in a gas turbine engine configured without a geartrain. The powerplant assembly 20 may be included in a gas turbine engine configured with a single spool, with two spools, or with more than two spools. The gas turbine engine may be configured as a turbofan engine, a turbojet engine, a turboprop engine, a turboshaft engine, a propfan engine, a pusher fan engine or any other type of gas turbine engine. The gas turbine engine may alternatively be configured as an auxiliary power unit (APU). The present disclosure therefore is not limited to any particular types or configurations of gas turbine engines. Moreover, the powerplant assembly 20 is not limited to gas turbine engine applications. For example, the aircraft powerplant may also or alternatively include an electric motor and/or another type of internal combustion engine such as a rotary engine (e.g., a Wankel engine) or a reciprocating piston engine.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A method for operating an aircraft system, comprising:
   rotating a shaft of an aircraft powerplant;
   receiving, at a controller, a torque signal indicative of a torque applied to the shaft while the shaft is rotating;
   determining, using the controller, a noise parameter indicative of noise in the torque signal;
   identifying, using the controller, a fault in the torque signal when the noise parameter is equal to or greater than a threshold;
   identifying, using the controller, a fault in a torque sensor when the fault in the torque signal is identified, wherein the torque signal is received from the torque sensor; and
   signaling, using the controller, a user interface to provide notification of the identified fault in the torque signal.

2. The method of claim 1, wherein the noise parameter is a signal-to-noise ratio of the torque signal.

3. The method of claim 1, wherein the noise parameter is determined over a period of time.

4. The method of claim 1, wherein the threshold is a fixed threshold.

5. The method of claim 1, further comprising determining the threshold based on one or more operational parameters for the aircraft powerplant.

6. The method of claim 1, further comprising determining the threshold based on one or more previously determined noise parameters.

7. The method of claim 1, wherein
   the torque signal is received from a torque sensor; and
   the torque sensor comprises a phonic wheel arranged with the shaft.

8. The method of claim 1, further comprising:
   performing a control operation for the aircraft powerplant based on actual torque data from the torque signal when the fault is not identified in the torque signal; and
   performing the control operation based on estimated torque data when the fault is identified in the torque signal.

9. The method of claim 1, wherein the aircraft powerplant is configured as part of an aircraft propulsion system.

10. The method of claim 1, wherein the aircraft powerplant is configured as part of an aircraft power generation system.

11. The method of claim 1, wherein the aircraft powerplant comprises a gas turbine engine.

12. The method of claim 1, wherein the method further includes the step of
    upon identification of the fault, inspecting the aircraft powerplant to determining a source of the identified fault.

13. A method for operating an aircraft system, comprising:
    rotating a rotating structure of an aircraft powerplant;
    receiving a torque signal indicative of a torque applied to the rotating structure while the rotating structure is rotating;

determining a signal-to-noise ratio of the torque signal;

identifying a fault in the torque signal when the signal-to-noise ratio is equal to or greater than a threshold; and inspecting the aircraft powerplant to determine a source of the identified fault.

14. The method of claim 13, wherein the rotating structure comprises an engine shaft.

15. The method of claim 13, wherein the rotating structure comprises a bladed rotor.

16. A system for an aircraft, comprising:

a rotating structure comprising an engine shaft;

a torque sensor configured to provide a torque signal indicative of a torque applied to the rotating structure while the rotating structure is rotating, the torque sensor comprising a sensor rotor and a sensor probe, the sensor rotor comprising a phonic wheel mounted to the rotating structure, the phonic wheel including a torque rotor and a reference rotor, the torque rotor projecting radially outward from the rotating structure to a torque rotor outer periphery, and the torque rotor including a plurality of torque teeth arranged circumferentially about an axis in a circular array at the torque rotor outer periphery; and a controller in signal communication with the torque sensor, the controller configured to determine a noise parameter indicative of noise in the torque signal, and the controller configured to identify a fault in the torque signal when the noise parameter is equal to or greater than a threshold.

17. The system of claim 16, wherein the noise parameter is indicative of a signal-to-noise ratio of the torque signal.

18. The system of claim 16, further comprising a gas turbine engine comprising the rotating structure.

19. The system of claim 16, wherein the reference rotor includes a rotor mount, a rotor tube, a rotor hub and a plurality of reference teeth;

the rotor mount is connected to the rotating structure and separate from the torque rotor;

the rotor tube connects the rotor hub to the rotor mount; and the plurality of reference teeth are arranged circumferentially about the axis in a circular array at a rotor hub outer periphery.

\* \* \* \* \*